United States Patent [19]

Palmer et al.

[11] 4,368,234

[45] Jan. 11, 1983

[54] WOVEN MATERIAL AND LAYERED ASSEMBLY THEREOF

[75] Inventors: Raymond J. Palmer, Newport Beach, Calif.; Dominique Micheaux, Villette d'Anthon, France

[73] Assignee: McDonnell Douglas Corporation, Long Beach, Calif.

[21] Appl. No.: 217,424

[22] Filed: Dec. 17, 1980

[30] Foreign Application Priority Data

Dec. 21, 1979 [FR] France .................. 79 32135

[51] Int. Cl.³ ............................................. B32B 7/00
[52] U.S. Cl. .................. 428/245; 139/426 R; 428/232; 428/246; 428/257; 428/258; 428/259; 428/260; 428/408; 428/902
[58] Field of Search ............ 428/246, 257, 258, 259, 428/260, 902, 910, 366, 367, 226, 232, 408; 139/426 R, 420, 422

[56] References Cited

U.S. PATENT DOCUMENTS 2,836,529  5/1958  Morris .......................... 428/257
3,983,282  9/1976  Seemann ........................ 428/902
3,997,697  12/1976  Brochier ...................... 428/259
4,103,055  7/1978  Levy .......................... 428/259

Primary Examiner—James J. Bell
Attorney, Agent, or Firm—Max Geldin

[57] ABSTRACT

Complex woven material as reinforcement for forming layered resin impregnated articles which are resistant to catastrophic damage from shock or local impact as from a hard object, comprised of woven bands or strips of high modulus fibers such as carbon or graphite fibers, separated in at least one direction of the material, from each other by woven bands or strips of low modulus fibers such as glass fibers, and which in a preferred embodiment are narrower than the strips of high modulus fibers. Superimposed layers of such materials can be formed, wherein the strips of high modulus fibers and low modulus fibers in the respective layers are at different angles. Such woven materials, e.g. in the form of a layered assembly, are impregnated with a suitable thermosetting resin such as an epoxy resin, and cured, to produce a layered resin impregnated article having improved damage tolerant physical and mechanical properties.

29 Claims, 10 Drawing Figures

WOVEN MATERIAL AND LAYERED ASSEMBLY THEREOF

BACKGROUND OF THE INVENTION

This invention relates to the production of a woven material, usually in the form of a layered assembly, as a reinforcement for structural components, and is particularly concerned with the provision of a woven material of the above type, which when impregnated with a suitable thermosetting resin to form a layered article, is resistant to catastrophic failure or damage from shock or hard local impact.

Most shaped structural type composite parts are made from multiple plies or layers of woven cloth or unidirectional type fiber (graphite, boron, Kevlar, fiberglass or mixtures of such materials), impregnated with "B" stage thermosetting resin, such as an epoxy resin. In fabricating such composites, layers of material are laid up one layer at a time in a prescribed fiber ply orientation pattern to form a laminate having a total thickness and fiber direction to carry the structural load required for the completed article. This layered assembly is then impregnated with a "B" stage resin if the individual layers were not previously impregnated with such resin, and the assembly cured under heat and pressure by conventional processes, dependent on the resin system in use. Parts or panels fabricated in this manner, particularly when employing woven graphite of high modulus, impregnated with a thermosetting resin such as an epoxy, have outstanding mechanical properties such as tensile and compression strength and stiffness. These fiber reinforced resin or plastic articles have numerous applications, particularly as structural components in airplanes, ships and automobiles.

However, cured laminate parts or panels particularly formed of high modular fibers such as graphite, have certain brittle characteristics and are easily damaged from shock or local impact as from a hard object, forming cracks or fissures resulting from the high modulus of these fibers, that is, their weak ability to stretch elastically. This damage can spread or propagate across a panel and cause catastrophic failure at greatly reduced loading compared to an undamaged panel. Further, holes drilled in such panels for attachment, e.g. of rivets, bolts, hinges, and the like, also cause similar loss in panel strength by creating areas of reduced shock and impact resistance.

The art of weaving highly oriented fibers such as fiberglass, graphite, boron or Kevlar, in the warp direction and employing a small number of tie yarns such as fiberglass, Kevlar or graphite in the fill direction is known in the art, as illustrated by U.S. Pat. No. 3,997,697. This patent discloses a complex woven unidirectional warp reinforcement, e.g. of boron thread, having in the fill direction loosely woven continuous fine diameter organic fiber threads that hold the warp reinforcement in a parallel cohesive unit.

French Pat. 2,034,787 discloses a woven material with major reinforcements in the unidirectional warp direction of the cloth, composed of a uniform mixture of high modulus graphite and low modulus glass fibers, held together in the fill direction in a loose manner with a continuous fine glass fiber thread which holds the unidirectional reinforcement in a parallel and cohesive unit, to provide a low cost material as compared to an all graphite woven material.

U.S. Pat. No. 2,836,529 discloses a woven unidirectional fabric consisting of alternate fibers of glass and metal with transverse metal fibers included in the woven cloth.

It is an object of the present invention to provide a woven fiber material as reinforcement which can be impregnated with resin and employed as a structural component having increased resistance to damage. Another object of the invention is to provide a woven material layered assembly as reinforcement for production of resin impregnated articles which are resistant to catastrophic damage from shock or impact from a hard object.

Still another object of the invention is to provide an improved woven material, as in the form of a layered assembly of the type described above, which when impregnated with a suitable thermosetting resin, forms an article having superior retained strength when in a minor damaged condition, and is then further loaded by fatigue or static stress, and hence is tolerant to further damage.

A still further object is the provision of a woven material for forming a layered article which when impregnated with a suitable resin forms structural parts or components which permit the drilling of holes for the placement of rivets, hinges and the like, without reducing the retained mechanical properties of the layered assembly.

SUMMARY OF THE INVENTION

According to the present invention, a portion of the high modulus fibers such as carbon, e.g. graphite, or boron, in a high modulus high strength woven material are replaced by bands of low modulus fibers, e.g. of fiberglass or organic fiber, e.g. Kevlar, to form alternate bands or strips of high modulus fibers and adjacent alternate bands or strips of low modulus fibers having a width different from the width of the strips of high modulus fibers. In one embodiment such strips extend lengthwise, that is in the warp direction of the woven material or cloth. Glass fibers or other low modulus fibers noted below extending in the fill direction (90°) and which are loosely woven, function as tie or binding yarns to secure the high modulus and low modulus fibers in the warp direction (0°) to form a soft drapeable and handleable woven cloth.

The width, spacing and thickness of the low modulus bands or strips can be varied to achieve the desired final physical and mechanical properties of the woven material. In one preferred embodiment low modulus, e.g. fiberglass strips, are woven into a high modulus graphite cloth or material, the low modulus strips being narrower than the width of the high modulus carbon or graphite strips.

However, the entire ratio of high to low modulus fiber strips or bands can be reversed and high modulus graphite bands of narrow width can be woven into low modulus fiberglass cloth to impart integral stiffness properties into a chiefly fiberglass panel. Thus, in general, the complex woven material of the invention for production of layered articles comprises high modulus, e.g. graphite, fibers separated in at least one direction, that is, the warp or fill direction, of the woven material, by strips of lower modulus fibers such as glass fibers, the width of the high modulus and low modulus fiber strips being varied, and wherein the low modulus strips preferably are narrow relative to the width of the high modulus, e.g. graphite strips.

Thus, in a woven material having graphite strips and fiberglass strips in the 0° warp direction, impregnated with a resin, when the resulting panel is highly loaded in the 0° direction and damage in the form of a crack occurs in the graphite area, such crack will propagate and stop at the edge of the low modulus fiberglass strips, and prevent or postpone any further damage or catastrophic failure of the panel, at least until a higher load is applied to the panel. Hence the resulting panel is considered a damage tolerant design. Further, attachment holes placed in the low modulus strips of a plastic article employing the woven reinforcement of the invention do not reduce the mechanical properties of the article and hence it is possible to pierce the layered article in those zones containing the low modulus fibers, in order to attach rivets, hinges and the like, without damaging the physical and mechanical properties of the high modulus, e.g. graphite fibers.

In a similar manner, biwoven materials can also be made with bands of various width spacings in either or both warp and fill directions to achieve the desired laminate properties. Further, the thickness of the low modulus strips can be greater than the thickness of the high modulus strips to achieve greater damage tolerance properties in the completed structure, as described below.

The high modulus fibers employed in the woven materials according to the invention are, for example, graphite or boron fibers, and the low modulus fibers are those having superior elastic lengthening properties, such as fiberglass, or an organic material such as a polyamide, e.g. Kevlar, understood as comprised of poly (paraphenylterephthalamide). The tie yarns also can be formed of such low modulus fibers, and also including fibers of a polyester such as Dacron.

As previously noted, the invention also encompasses complex woven materials in which both the warp and the fill fibers are comprised of alternating strips of high modulus, e.g. carbon or graphite fibers, and strips of low modulus, e.g. glass fibers; and also included are complex woven materials in which the strips of high modulus fibers are woven on the bias, with the yarn of a fine fiberglass or organic fiber loosely woven in the warp direction.

Advantageously, for one type of damage tolerance, the percentage of low modulus thread, e.g. glass fibers, relative to the high modulus fibers, e.g. carbon threads, can range between 8 and 20%, relative to the total weight of the material. Moreover, it has been observed that good damage tolerance results were obtained by providing a material in which the warp was made of strips of high modulus fibers, e.g. carbon fibers, having a width ranging between about 3.5 centimeters and 8 centimeters, and strips of low modulus threads (glass fibers, for example), the width of which ranges between about 0.5 centimeter and 1 centimeter. The density of the low modulus tie yarns can advantageously be about four yarns per centimeter, for example.

The woven material or cloth of the invention is particularly adapted for producing woven layered cloth reinforcement members for structural components in the form of a plurality of layers of such woven materials stacked in a predetermined sequence, particularly with respect to the location of the strips of low modulus fibers in the respective layers so that such strips are superimposed one over the other and forming zones made up of only low modulus fibers. Thus, a layered material of the above type can be formed, wherein individual woven layers containing strips of high modulus fibers, e.g. carbon fibers, and strips of low modulus fibers, e.g. fiberglass, extending in the 0° direction, are stacked, with adjacent layers of the woven material at right angles to each other. Also a layered material of the above type can be formed wherein some of the layers are formed of a woven material having strips of high modulus fibers and strips of low modulus fibers extending in the 0° direction, with other layers formed of a woven material having strips of high modulus fibers extending in a 45° direction and crossing the strips in the 0° direction of the first mentioned layers.

Any suitable thermosetting resin can be employed for impregnating the complex woven material, e.g. for producing layered articles, such as epoxy, polyimide or polyester resins. Also, thermoplastic resins such as polysulfone, polyether sulfone or polypropylene resins can be employed.

Broadly, the invention provides a woven reinforcement material adapted to be formed into layers for producing structural components, which comprises woven alternate strips of high modulus fibers and strips of low modulus fibers, said strips extending in at least one direction in the woven material, the strips of low modulus fibers having a width different from the width of the strips of high modulus fibers.

The woven material reinforcement of the present invention differs substantially from the woven materials of the prior art such as those of the patents noted above. Thus there is no teaching in the above patents of woven materials having strips of high modulus fibers and alternate strips of low modulus fibers, of non-uniform width, and having the advantageous properties noted below. Further, there is no teaching in such patents of stacking layers of the latter woven materials in a stacking sequence particularly to locate or orient the strips or bands of low modulus fibers in the respective layers, so that they are superimposed one over the other, according to the present invention.

THE DRAWINGS

The invention will be more fully described hereinafter in connection with the accompanying drawings, wherein.

Figure 1:
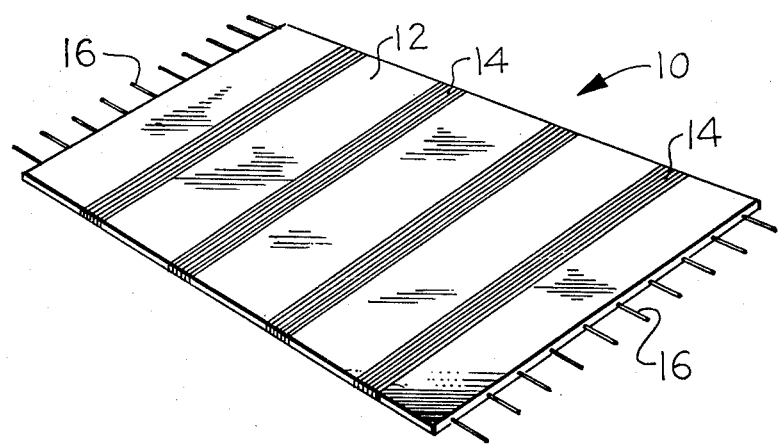
FIG. 1 is a schematic representation in perspective of a complex woven material according to the invention.
Figure 2:
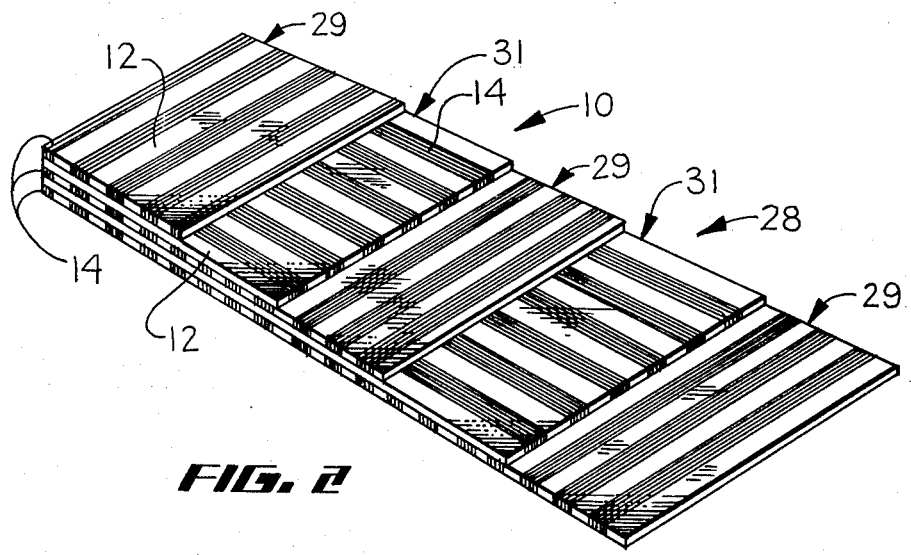
Figure 1B:
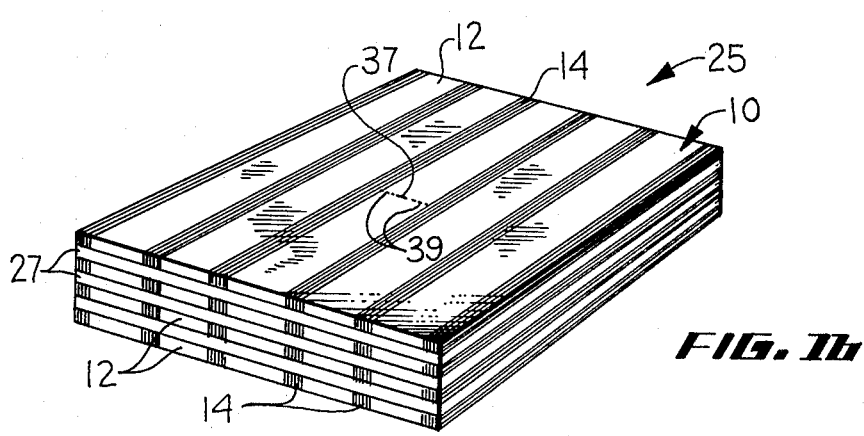
FIG. 1b is a schematic illustration of a layered assembly comprised of layers of woven material of the type illustrated in FIG. 1.
Figure 3:
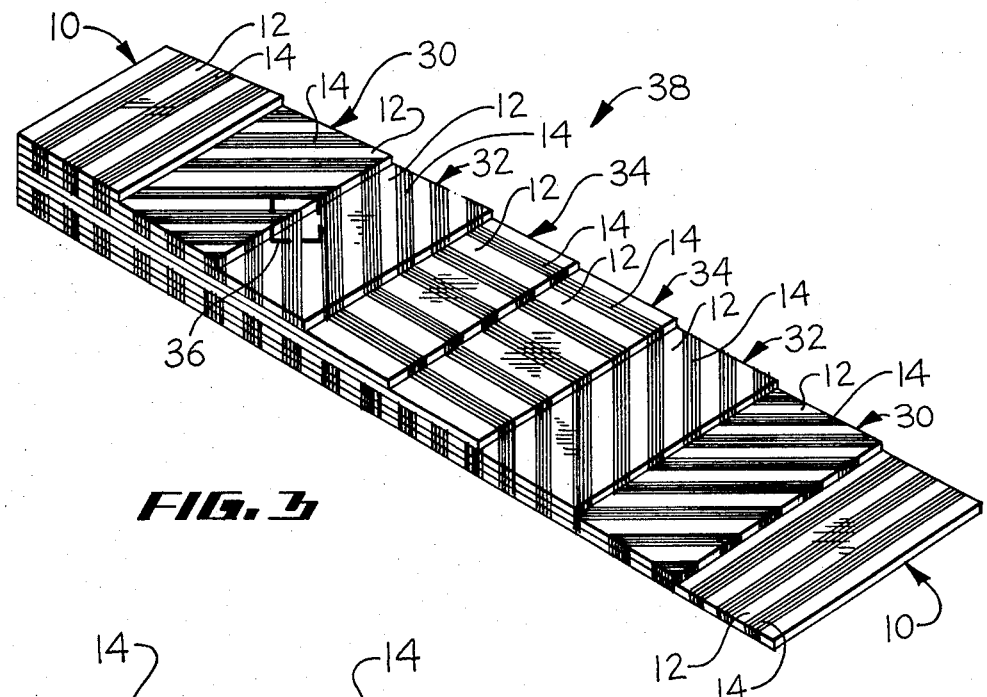
Figure 4:
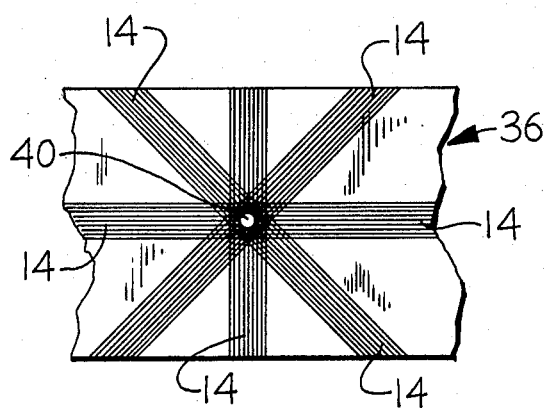
Figure 5:
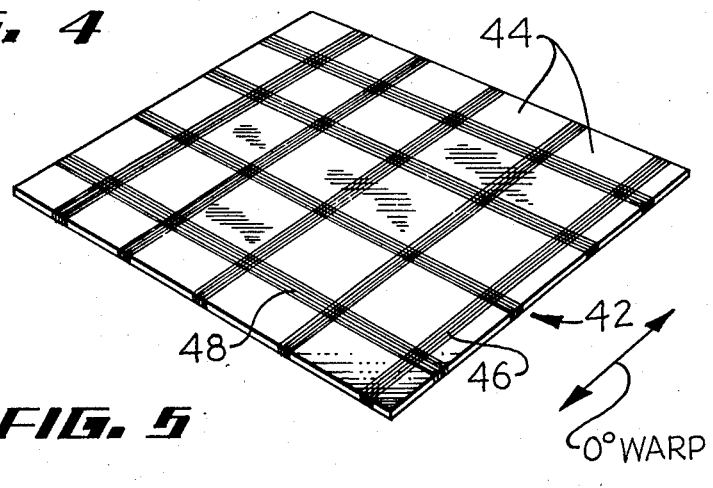
Figure 6:
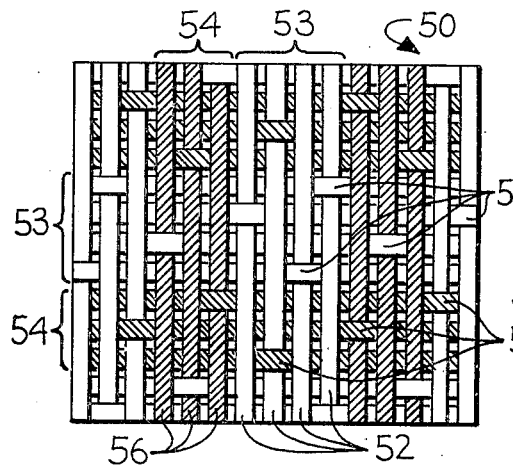
Figure 7:
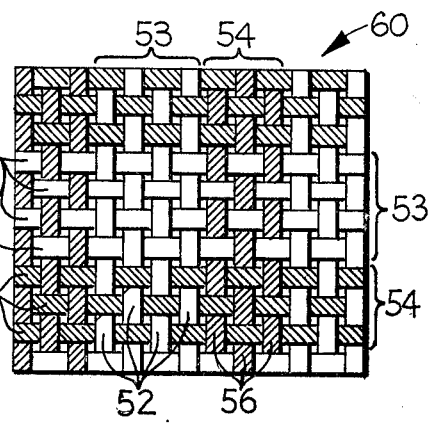
Figure 1A:
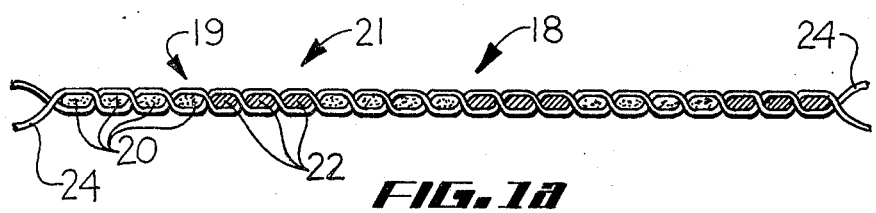
FIG. 1a is a cross section of a complex woven material of the type illustrated in FIG. 1.
Figure 8:
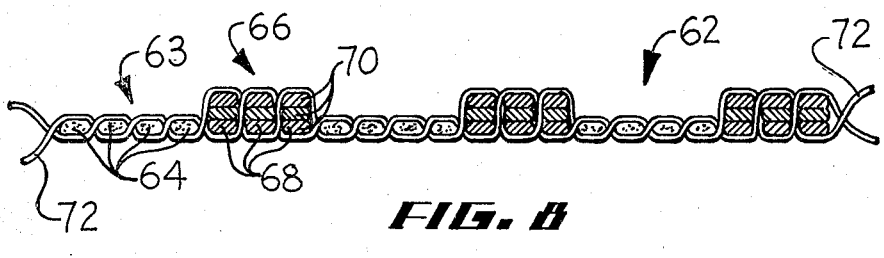

FIG. 2 schematically illustrates in perspective a layered assembly in which the various layers are crisscrossed and superimposed at right angles to each other;

FIG. 3 illustrates in perspective a layered assembly provided by superimposing a plurality of layers of a woven material according to the invention, wherein the low modulus or softening strips of certain layers are positioned at a 0°, 45° and 90° angle to each other;

FIG. 4 is a schematic plan view of a portion of the layered material illustrated in dotted lines in FIG. 3, showing the super-position or intersection zone of the low modulus fibers, and into which zone a hole can be made;

FIG. 5 is a schematic illustration of a bi-woven material or cloth with bands or strips of low modulus, e.g. fiberglass, in both directions, that is the warp and fill directions, of the material;

FIG. 6 illustrates one specific type of conventional bi-woven material, but having bands or strips of opposite stiffness fibers according to the invention;

FIG. 7 illustrates still another form of conventional bi-woven material embodying the principles of the invention; and FIG. 8 illustrates a unidirectional woven material similar to FIG. 1a, but in which the strips of low modulus fibers are thicker than the strips of high modulus, e.g. graphite, fibers.

DETAILED DESCRIPTION OF PREFERRED EMBODIMENTS OF THE INVENTION

Referring to FIG. 1 of the drawing, numeral 10 illustrates a complex woven material according to the invention, comprised of high modulus high strength fibers, e.g. graphite fibers, oriented in the 0° or warp direction and forming the wide bands or strips 12, such material having woven therein strips 14 of low modulus, e.g. glass fibers, also in the warp direction, and of narrower width than the strips or bands of carbon fibers 12. Thus, there are formed alternating high modulus fiber strips 12 and narrower alternating low modulus fiber strips 14 extendding in the warp direction. An example of high modulus high strength fibers which can be employed are the graphite fibers Thornel 300, each fiber or thread containing 3,000 filaments. An example of low modulus fibers is E-glass having a twist of 80 revolutions per meter and 272 grams/1000 meters. S-glass fibers also can be employed. Low modulus fibers such as fiberglass replace the graphite fibers in bands 14 of desired width and thickness, in the 0° direction, at prescribed intervals across the width of the woven cloth. In general, the amount of fiberglass is selected to be the same thickness as the graphite it replaces. This is not necessary and the fiberglass can be thicker to add certain additional toughness properties to the final part, as noted below.

The alternate bands 12 of graphite and 14 of fiberglass are held together by a loose flexible yet secure woven 90° cross tie thread 16 of light weight fiberglass such as 34/2 thread, or organic fiber such as Dacron (polyester) at a frequency of, for example, 4 to 8 threads per inch. The width, thickness and frequency of the high modulus and low modulus fiber bands can be varied from one extreme of mainly graphite and narrow glass fiber bands, to mainly glass fiber and narrow bands of graphite dependent on the desired mechanical properties. Thus, for example, strips 12 can be formed of 40 graphite fibers of the above type to form a strip 50 mm wide, and the strips 14 of low modulus fibers can be comprised of 4 glass fiber threads, providing a strip 5 mm wide.

Referring to FIG. 1a showing a cross section of a specific form of uni-woven material of graphite fibers having strips of glass fibers of the type illustrated in FIG. 1, the resulting woven material 18 contains areas or strips 19 comprised of four carbon fibers 20 and alternating strips 21 of three glass fibers 22. The strips of graphite and glass fibers are in the warp direction and are held together by loosely woven binding or tie yarns 24, in the fill direction. Such lightweight tie yarns can be fiberglass or organic fibers such as Kevlar or a polyester such as Dacron, woven back and forth from one side of the woven material to the opposite side thereof. The strips of graphite and of glass fibers can constitute about 95% of the woven material, with about 5% tie yarns.

The woven material 10 of FIG. 1, containing the alternate bands 12 of graphite fibers and 14 of low modulus glass fibers, of the type illustrated at 18 in FIG. 1a, can be impregnated with a suitable resin, e.g. a "B" stage epoxy resin, and the resulting resin impregnated sheet can be finally cured or used in producing a layered material as described below.

Now referring to FIG. 1b there is shown a layered assembly 25 formed of a plurality of layers of woven material of the type indicated at 10 in FIG. 1, with alternate graphite fiber strips 12 and glass fiber strips 14 in the 0° warp direction, separated by alternate intermediate layers 27 of woven material having all graphite fibers extending in the 90° direction. Such intermediate layers 27 can be in any desired fiber direction such as 45° or 90°. The alternate layers of woven material 10 are oriented so that the graphite fiber strips 12 and the glass fiber strips 14 of such respective layers are in vertical alignment.

In FIG. 2 of the drawing, a plurality of layers of woven material of the type indicated at 10 in FIG. 1 are laid up layer on top of layer and oriented with adjacent layers 29 and 31 positioned at 90° to each other, to form the layered assembly 28. In those layers 31 where the low modulus strips 14 are at 90°, fill direction, the tie yarns of such layers are in the 0° warp direction. The layers 29 and 31 are arranged so that the fiberglass strips or bands 14 of alternate layers are in vertical alignment with each other. This facilitates the making of perforations, through the vertically aligned low modulus softening strips 14, for the attachment of rivets and other mechanical fasteners, with minimal reduction of strength of the material around the perforations.

In FIG. 3 of the drawing, woven layers of the cloth or material 10 of FIG. 1 wherein the graphite strips 12 and the fiberglass strips 14 are in the 0° (warp) direction, are laid up with layer on top of layer first of a woven material 30 having the graphite fiber strips 12 and glass fiber strips 14 positioned at +45° to each other, a woven material 32 wherein the graphite fiber strips 12 and fiberglass strips 14 are at −45° to each other, and another woven layer 34 in which the graphite fiber strips 12 and fiberglass strips 14 are at 90° (fill) direction. Additional layers of woven material 34 with the strips in the 90° direction, 32 with the strips in the −45° direction, 30 with the strips in +45° direction and 10 with the strips in the 0° direction are laid up, to form an eight layer laminate 38. The woven layers are aranged in FIG. 3 so that the glass fiber strips 14 are in vertical alignment with each other.

The woven laminate assemblies 25 of FIG. 1b, 28 of FIG. 2 and 38 of FIG. 3 can be impregnated with a suitable resin, e.g. a "B" stage epoxy resin, placed in a suitable tool and the assembly is cured by a procedure known in the art employing suitable heat/pressure/time processing techniques. Thus, in the case of an epoxy resin, final curing temperature can range from about 250° F. to 350° F. at pressures of about 50 to about 100 psi, the curing time ranging from about 30 minutes to about 2 hours, depending upon the curing temperature and resin catalyst system.

Referring to FIG. 1b, following impregnation of layered assembly 25, with a resin, and curing to form a structural component or panel, as load is applied in the 0° warp direction, the graphite portion comprised of strips 12 of high elastic modulus, carries most of the load. The low modulus fiberglass softening strips 14 will not carry much load in this direction. Therefore, when the resin impregnated cured woven material or panel is highly loaded in the warp direction any damage such as a crack indicated at 37 in FIG. 1b, will propagate outwardly as indicated by dotted lines 39, and stop at the edge of the adjacent lower stressed areas or strips 14 of the glass fibers, thus limiting the crack 37 to a length corresponding to its distance between two consecutive strips of the low modulus glass fibers 14. This limits the spread of damage in the woven fiber strip reinforced plastic panel 25 and prevents catastrophic damage to the panel. The result is higher retained strength for a damaged or partially damaged woven composite or panel.

In FIG. 4 is illustrated the super positioning or intersection of the low modulus fiberglass bands 14 of aligned vertical layers in FIG. 3 around the area or zone indicated by dotted lines 36 in FIG. 3. It is seen that in the zone 36 the low modulus fiberglass strips or bands 14 from the 0° and 90° materials 10 and 34, respectively, intersect with the glass fiber strips 14 of the +45° and −45° fiberglass strips of the woven layers 30 and 32, respectively, permitting the formation of a hole 40 at such intersection through the low modulus fiberglass bands 14 of the respective layers, without weakening or reducing the mechanical characteristics and strength of the woven materials around the hole. Such hole is used for the attachment of mechanical fasteners, e.g. rivets, bolts, and the like.

In FIG. 5 there is illustrated a bi-woven material or cloth 42 comprised of high modulus or graphite yarns as at 44, containing strips 46 of low modulus, e.g. fiberglass, in parallel spaced relation in the 0° warp direction and strips 48 of low modulus, e.g. glass fibers, extending in parallel spaced relation in the 90° or fill direction. Such bi-woven materials with bands of low modulus, e.g. glass fibers in both 0° and 90° directions, permit the obtaining of the advantages of the invention with respect to retained damage characteristics upon loading in either the 0° or 90° direction.

Various forms of bi-woven cloth or material can be provided embodying the invention concept of alternating bands or strips of high modulus fibers and low modulus fibers. Thus, referring to FIG. 6, there is shown an 8 harnass satin weave cloth 50 containing an under one, over seven weave, with a pattern of four rows of graphite fibers 52 forming strips 53, separated by strips or bands 54 comprised of three rows of fiberglass 56, such strips 53 and 54 extending in both the 0° and 90° directions.

In FIG. 7 there is illustrated another form of bi-woven material 60 employing a plain square over-under weave of four rows of high modulus graphite yarns 52 forming rows 53 separated by low modulus bands 54 comprised of three rows of low modulus glass fibers 56, such strips 53 and 54 extending in both the 0° and 90° directions.

As previously noted, the width of the softening strips or low modulus strips in the high modulus material or panel can be varied. It is also noted that the thickness of the low modulus strips or bands can be greater than the thickness of the high modulus or graphite bands to achieve greater elasticity in the 0° direction. This is illustrated in FIG. 8, showing the woven material 62 formed of strips 63 of graphite fibers 64 having alternate strips 66 of low modulus glass fibers 68, in which each of the low modulus strips 66 is formed of three layers 70 of the glass fibers 68. A tie yarn 72 of fiberglass or organic yarn such as Kevlar extends in the 90° direction, to secure the rows or bands of graphite and glass fibers.

In accordance with the invention principles, an opposite fiber mix, that is a woven material having a high percentage of low modulus fibers, e.g. fiberglass, can be stiffened with narrow bands of high modulus fibers such as graphite, to improve the stiffness characteristics of a low modulus e.g. fiberglass, panel.

Further, it will be noted that the holes such as at 40 in FIG. 4 are not required to be entirely through the low modulus, e.g. fiberglass area, but such hole can be disposed at any location in one or more of the low modulus, e.g. fiberglass, strips in the direction of tensile load, and as long as the fiberglass strip is wider than the hole, the strength loss of the material adjacent the hole will be substantially less than in the case of an all-graphite construction.

Thus, it is seen that the invention provides an improved complex woven material having important advantages over the prior art woven material for use as fiber reinforcement material adapted to be impregnated with a resin. Thus, panels or materials with low modulus or softening strips in one or more directions have superior retained strength, when in a damaged condition, and then loaded by fatigue or static stress. Attachment holes placed in the softening strips, cause minor effect on the load carrying abilities of the panel.

Low modulus softening strips are located and held in close tolerance by automated weaving equipment which retains their location during the "lay-up" and curing process associated with the ply-by-ply stacking and curing of typical composite structures. Thus, the softening strips can be readily oriented one above the other in one or more fiber orientation directions to achieve the desired softening strip pattern in the structure. Panels with layered softening strips in varying fiber orientation directions will restrain the propagation of impact damage occuring in the high modulus area between the softening strips adjacent the impact location. Single row rivets, installed in holes drilled in the low modulus softening strips, will carry a greater load across a joint, than a similar riveted joint in the same fiber pattern all-graphite joint. In a like manner, multiple rows of bolts, installed through the low modulus softening strips will have superior joint strength compared to an all-graphite bolted joint.

Thus, in summary, the invention provides the features: (a) a woven cloth with alternate bands of high and low modulus fibers in a soft handleable form, (b) a woven cloth with precise secure location, width and thickness of low or high modulus strips or bands, (c) a low cost method of fabrication of laminated structures with bands of low and high modulus fibers, (d) laminated structures with low stress rise of attachment holes provided in the low modulus bands, (e) laminated structures with retained damage propagation properties in all directions, and (f) improved mechanical fastener joints.

While particular embodiments of the invention have been described for purposes of illustration, it will be understood that various changes and modifications within the spirit of the invention can be made, and the invention is not to be taken as limited except by the scope of the appended claims.

What is claimed is:

1. A woven reinforcement material adapted to be formed into layers for producing damage tolerant structural components, which comprises woven alternate strips each formed of a plurality of high modulus fibers and additional strips each formed of a plurality of low modulus fibers, said strips extending in at least one direction in the woven material, the strips of low modulus fibers having a width different from the width of the strips of high modulus fibers.

2. A woven reinforcement material as defined in claim 1, wherein said woven material is an essentially high modulus woven material, said strips of low modulus fibers being narrower than said strips of high modulus fibers.

3. A woven reinforcement material as defined in claim 1, said high modulus fibers and said low modulus fibers extending in a single direction of said woven material, said fibers being secured together by low modulus tie yarns extending in another direction.

4. A woven reinforcement material as defined in claim 1, wherein said high modulus fibers are carbon or boron fibers, and said low modulus fibers are fiberglass or organic fibers.

5. A woven reinforcement material as defined in claim 1, wherein said woven material is an essentially low modulus woven material, said strips of high modulus fibers being narrower than said strips of low modulus fibers.

6. A woven reinforcement material as defined in claim 2, said strips of high modulus fibers and said strips of low modulus fibers extending in the 0° (warp) direction, said high modulus fibers being carbon fibers and said low modulus fibers being fiberglass.

7. A woven reinforcement material as defined in claim 6, said fibers being secured together by glass fibers or organic fibers extending in the 90° (fill) direction.

8. A woven reinforcement material as defined in claim 2, said strips of high modulus fibers and said strips of low modulus fibers extending in a 90° direction, said high modulus fibers being carbon and said low modulus fibers being fiberglass.

9. A woven reinforcement material as defined in claim 2, said strips of high modulus fibers and said strips of low modulus fibers extending in a 45° direction, said high modulus fibers being carbon and said low modulus fibers being fiberglass.

10. A woven reinforcement material as defined in claim 3, said high modulus fibers being carbon fibers, and said carbon fibers and said low modulus fibers extending in the warp direction.

11. A woven reinforcement material as defined in claim 10, said strips of carbon fibers having a width ranging between about 3.5 cm and 8 cm, and said low modulus fibers having a width ranging between about 0.5 cm and 1 cm.

12. A woven reinforcement material as defined in claim 10, wherein said low modulus fibers and said tie yarn are fiberglass or organic fiber.

13. A woven reinforcement material as defined in claim 2, said material being a biwoven material, wherein said alternate strips of high modulus fibers and said strips of low modulus fibers extend in the warp direction, and alternate strips of high modulus fibers and strips of low modulus fibers extend in the fill direction.

14. A woven reinforcement material as defined in claim 2, said strips of low modulus fibers being thicker than said strips of high modulus fibers.

15. A woven reinforcement material as defined in claim 14, said high modulus fibers being carbon fibers and said low modulus fibers being fiberglass.

16. A woven layered cloth reinforcement member for producing damage tolerant structural components when impregnated with a resin, which comprises a plurality of layers of woven material stacked in a predetermined sequence, said woven material comprising woven alternate strips each formed of a plurality of high modulus fibers and additional strips each formed of a plurality of low modulus fibers, said strips extending in at least one direction in the woven material, the strips of low modulus fibers having a width different from the width of the strips of high modulus fibers, said strips of low modulus fibers and said strips of high modulus fibers in at least some of said layers being in alignment.

17. A woven layered cloth reinforcement member as defined in claim 16, wherein said woven material is an essentially high modulus woven material, said strips of low modulus fibers being narrower than said strips of high modulus fibers.

18. A woven layered cloth reinforcement member as defined in claim 17, said high modulus fibers and said low modulus fibers extending in a single direction of said woven material, said fibers being secured together by low modulus tie yarns extending in another direction.

19. A woven layered cloth reinforcement member as defined in claim 18, wherein said high modulus fibers are carbon or boron fibers, and said low modulus fibers are fiberglass or organic fiber.

20. A woven layered cloth reinforcement member as defined in claim 16, wherein the stacked layers are disposed either at a right angle or at different angles to each other, said strips of low modulus fibers in the respective layers being superimposed one over the other.

21. A woven layered cloth reinforcement member as defined in claim 17, said high modulus fibers and said low modulus fibers extending in the 0° direction, with adjacent layers of said woven material at right angles to each other.

22. A woven layered cloth reinforcement member as defined in claim 17, said strips of high modulus fibers and said strips of low modulus fibers of some of said layers extending in the 0° direction, said strips of high modulus fibers and said strips of low modulus fibers of other layers extending in a 45° direction and crossing the strips in the 0° direction of said first mentioned layers.

23. A woven layered cloth reinforcement member as defined in claim 16, wherein said high modulus fibers are carbon or boron fibers, and said low modulus fibers are fiberglass or organic fiber.

24. A woven layered cloth reinforcement member as defined in claim 16, said high modulus fibers being carbon fibers, said strips of low modulus fibers forming zones made up of only said low modulus fibers.

25. A woven layered cloth reinforcement member as defined in claim 16, wherein the percentage of low modulus fibers to the high modulus fibers ranges between 8 and 20%, relative to the total weight of the member.

26. A woven layered cloth reinforcement member as defined in claim 18, wherein the tie yarns are selected among the fibers of glass, polyester, and polyamide, the density of said tie yarns being about four yarns per centimeter.

27. A woven layered cloth reinforcement member as defined in claim 16, said layered member being impregnated with a resin.

28. A woven layered cloth reinforcement member as defined in claim 16, said layered member being impregnated with a "B" stage thermosetting resin selected from the group consisting of epoxy, polyester and polyimide resins and cured.

29. The resin impregnated structure as defined in claim 27, wherein said stacked layers are oriented so that areas of the strips of low modulus fibers of adjacent layers intersect to form aligned zones of intersection of low modulus fiber strips in each of the layers throughout the stacked layers, and including receiving means positioned in said aligned zones of intersecting strips of low modulus fibers.

* * * * *

UNITED STATES PATENT AND TRADEMARK OFFICE
CERTIFICATE OF CORRECTION

PATENT NO. : 4,368,234

DATED : January 11, 1983

INVENTOR(S) : Raymond J. Palmer et al.

It is certified that error appears in the above-identified patent and that said Letters Patent is hereby corrected as shown below:

On the title page, assignee should read:

-- McDonnell Douglas Corporation and Brochier and Fils --.

Signed and Sealed this

Twenty-fourth Day of May 1983

[SEAL]

Attest:

DONALD J. QUIGG

Attesting Officer     Acting Commissioner of Patents and Trademarks